United States Patent [19]

Ross et al.

[11] Patent Number: 4,721,690

[45] Date of Patent: Jan. 26, 1988

[54] HIGH PBO-CONTENT GLASSES IN THE SYSTEM SIO$_2$—PBO—M$_2$O WITH INCREASED CHEMICAL STABILITY

[76] Inventors: Ludwig Ross; Danuta Grabowski; Burkhard Speit; Volkmar Geiler, all of Hattenbergstrasse 10, 6500 Mainz, Fed. Rep. of Germany

[21] Appl. No.: 698,330

[22] Filed: Feb. 5, 1985

[30] Foreign Application Priority Data

Feb. 8, 1984 [DE] Fed. Rep. of Germany ....... 3404363

[51] Int. Cl.$^4$ .................. C03C 3/102; C03C 13/02; C03C 3/07; C03C 4/00
[52] U.S. Cl. .................. 501/60; 501/38; 501/57; 501/58; 501/59; 501/61; 501/62; 501/74; 501/75; 501/76; 501/901; 501/903
[58] Field of Search .................. 501/903, 901, 60, 74, 501/61, 75, 38, 57, 58, 59, 62, 74, 75, 76, 77, 901, 903

[56] References Cited

U.S. PATENT DOCUMENTS

| | | | |
|---|---|---|---|
| 3,902,910 | 9/1975 | Hares et al. | 501/61 |
| 4,038,448 | 7/1977 | Boyd et al. | 501/75 X |
| 4,211,569 | 7/1980 | Hares et al. | 501/75 X |
| 4,351,906 | 9/1982 | Boudot et al. | 501/74 |
| 4,424,090 | 1/1984 | Kyle | 501/15 |
| 4,562,162 | 12/1985 | Sagara | 501/903 |

FOREIGN PATENT DOCUMENTS

| | | | |
|---|---|---|---|
| 55-011627 | 3/1980 | Japan | |
| 57-179050 | 11/1982 | Japan | 501/903 |
| 60-16831 | 1/1985 | Japan | 501/903 |

Primary Examiner—Mark L. Bell

[57] ABSTRACT

High PbO-content glass in the optical range of flint and heavy flint glasses from the system SiO$_2$—PbO—M$_2$O wherein M$_2$O=alkali metal oxides, said glass having a minimum PbO content of 30 wt. % and a minimum M$_2$O content of 0.5 wt. %, are provided with enhanced chemical stability without loss of the desired optical position by replacing a portion of the SiO$_2$ and PbO such that the glass contains 1.5–6 wt. % (TiO$_2$+ZrO$_2$) and the ratio of TiO$_2$:ZrO$_2$ is about 0.3–2.0.

7 Claims, 2 Drawing Figures

FIGURE 1: OPTICAL POSITION OF GLASSES FROM THE
(PRIOR ART) SYSTEM $PbO - SiO_2 - M_2O$ (O) AND FROM
THE SYSTEM $PbO - SiO_2 - M_2O - TiO_2$ (+)

HIGH PBO-CONTENT GLASSES IN THE SYSTEM SIO₂—PBO—M₂O WITH INCREASED CHEMICAL STABILITY

DESCRIPTION OF THE INVENTION

1. Technical Field of the Invention

This invention relates to lead glasses of the system $SiO_2$—$PbO$—$M_2O$ ($M_2O$=alkali metal oxide), of which the chemical stability is improved whilst preserving the basic glass system by addition of certain components, the remaining properties of the glasses undergoing no significant change or being likewise improved.

2. Background Art

The state of the art nearest to the invention is described in JP-PS 80 011 627. According to this glasses can be produced in the refractive index-/Abbe number range of 1.64–1.91/21.0–35.0, which corresponds to the positional range of conventional lead glasses. JP-PS 80 011 627 describes glasses within the system $SiO_2$/$PbO$/$Al_2O_3$ which may also contain $B_2O_3$, $ZnO$, $Bi_2O_3$, $TiO_2$, $ZrO_2$, $Ta_2O_5$, $Nb_2O_5$, $WO_3$, and a refining agent. It is true that chemically stable glasses corresponding to conventional lead glasses are possible in the specified composition range; however, due to the omission of alkali metal oxides, these have only a slight crystallization stability, especially with increasing $TiO_2$- or $ZrO_2$ contents ($\geq 1.5$ wt.%).

Additionally, the lack of alkali metal oxides makes melting down of the $ZrO_2$ more difficult and has been found to yield an inclusion-free glass only by adopting the expedient of a drastic temperature increase in the melting tank. Such temperature increase, however, means that severe disadvantages must be accepted, for example lower transmission by $\lambda = 400$ nm, more vigorous corrosion of the melting tank and undesirably higher lead evaporation.

Chemically stabilized lead glasses have been known for a long time and are produced by application of $TiO_2$. These glasses do not afford the possibility of application of the conventional lead glasses because it is not possible in such a system $SiO_2$—$PbO$—$M_2O$—$TiO_2$ ($M_2O$=alkali metal oxides) to obtain the same optical position as in conventional lead glass (see FIG. 1). Moreover, the $TiO_2$ content which is required for chemical stabilization entails, particularly with the high lead content glasses such as those commercially available from Schott Glaswerke and described in their current catalog, too heavy transmission losses of the order of 400 nm as shown in the following Table 1:

TABLE 1

Transmissibility Comparison:
$PbO$—$SiO_2$—$M_2O$ System (o)
$PbO$—$SiO_2$—$M_2O$—$TiO_2$ System (+)

| Schott Glass | $n_d$ | $\tau i_{25 mm}^{400 nm}$ | system |
| --- | --- | --- | --- |
| SF 2 | 1.65 | 0.97 | o |
| SF 12 | 1.65 | 0.93 | + |
| SF 4 | 1.76 | 0.84 | o |
| SF 14 | 1.76 | 0.28 | + |
| SF 6 | 1.81 | 0.73 | o |
| SF 11 | 1.78 | 0.21 | + |

DISCLOSURE OF THE INVENTION

Accordingly, it is a general object of the present invention to provide a new series of lead glasses having the optical properties of conventional lead glass but with improved chemical stability.

Another object of the present invention is to provide such glasses which exhibit good crystallization stability.

A further object of the present invention is to provide such glasses which are chemically stabilized without exhibiting deleterious light transmission loss at 350–400 nm.

An additional object of the present invention is to provide such glasses which contain high zirconium oxide contents without having to increase melt temperatures.

A more particular object of the present invention is to provide new glass compositions for use as as optical glass, ophthalmic glass, radiation-protection glass, videoscreen glass, electrode glass, sounding glass, technical glass, in optical and technical glass fibers, or as lead crystal glass.

BRIEF DESCRIPTION OF THE DRAWINGS

The above and other objects, features, and advantages of the present invention will become more fully apparent to those skilled in the art to which this invention pertains from the following detailed description, taken in conjunction with the annexed drawing, wherein.

BEST MODE FOR CARRYING OUT THE INVENTION

Figure 1:
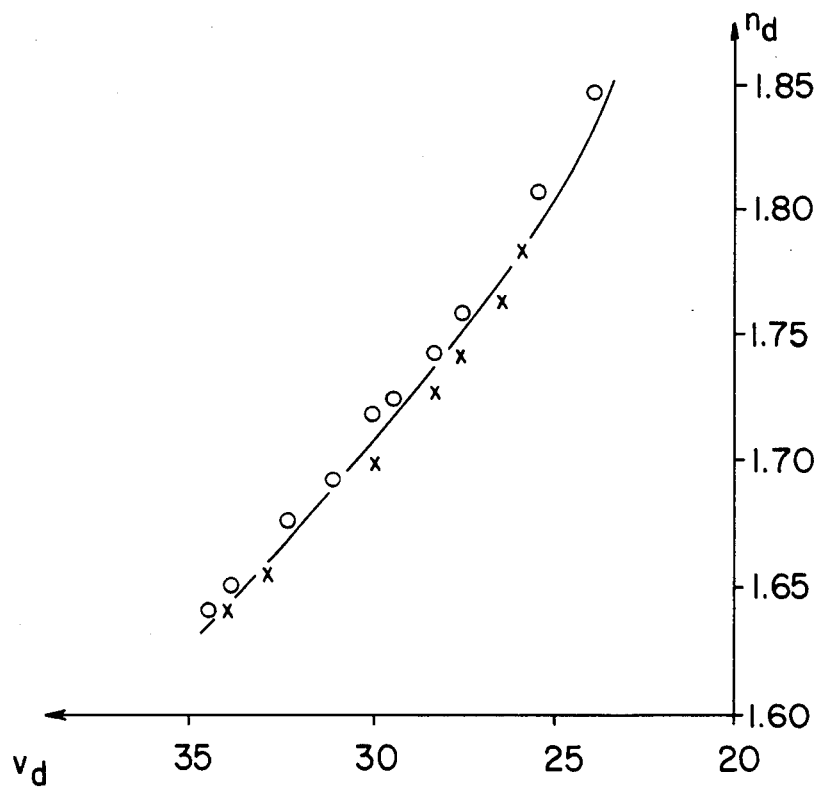
FIG. 1 compares the optical positions of glasses of the system $SiO_2$—$PbO$—$M_2O$—$TiO_2$ (+) with commercially available lead glasses (o).

In order to produce a glass which is capable of fully replacing conventional lead glasses with improved chemical stability, it has been found necessary to find components of which an addition to the $PbO$—$SiO_2$—$M_2O$ system ($M_2O$=alkali metal oxides) would make it possible to achieve the desired result. The critical feature in this context has been found to be the joint application of $TiO_2$ and $ZrO$; with this combination, resistance to acids may be improved by several orders of magnitude. In the refractive index range $\geq 1.74$ the time for erosive removal of a 0.1 $\mu$m thick layer by nitric acid (0.5N, pH 0.3, 25° C.) is more than $10^4$ min. with the glasses according to this invention, while the conventional lead glasses shown in Table 1 exhibit this amount of erosion after only 10 min. Equally, for 0.1 $\mu$m layer thickness erosion by NaOH (pH 10, 90° C.), erosion time is longer by a factor of $\geq 3$ with glasses according to the invention as compared with conventional lead glasses.

Due to the exchange of lead against $TiO_2$ and $ZrO_2$ at a weight balanced ratio according to this invention applied jointly with a slight increase in the $SiO_2$ content, it is possible for the optical position (refractive index and Abbe number) to be precisely sustained. This is no longer possible upwards of a $TiO_2:ZrO_2$ ratio of about 2. Furthermore, transmissibility of the glasses deteriorates at such higher ratios since a certain zirconium percentage evidently contributes to stabilizing the tetravalent oxidation state of the titanium. In glasses of the $SiO_2$—$PbO$—$M_2O$—$TiO_2$ system, the transmissibility loss is due to the fact that one portion of the titanium is present in the trivalent state, which shows a strong absorption around 350–400 nm.

With a $TiO_2:ZrO_2$ ratio which is too low ($\leq 0.3$) and with zirconium contents in excess of 1.5, the crystallization tendency increases very strongly in alkali-containing lead glasses as well. This suggests that $TiO_2$ has a devitrification-stabilizing effect in the glass system according to the invention. The fraction of alkali metal oxides further enables higher zirconium oxide contents to be incorporated in the glasses according to the invention without having to raise melt temperatures, since $ZrO_2$ can be introduced in form of low melting complex compounds such as $Na_2SiZrO_5$.

The glasses according to the invention are characterized in that the system $SiO_2$—$PbO$—$M_2O$ ($M_2O$=alkali metal oxides) with a $PbO$ content of at least 30 wt.% the content in ($TiO_2+ZrO_2$) is maintained at 1.5-6 wt.% and the $TiO_2:ZrO_2$ ratio is maintained at 0.3-2.0.

A wide variety of known lead glass compositions can be modified according to the principles of the present invention by varying the known $PbO$ and $SiO_2$ contents. The $PbO$ content may be reduced and the $SiO_2$ content may be increased in accordance with the following Formula 1:

$$TiO_2+ZrO_2 = |\Delta PbO| - |\Delta SiO_2|, \quad (1)$$

in which the absolute value of $$\frac{|\Delta PbO|}{|\Delta SiO_2|} = 8 - 20.$$

In this formula:
$\Delta PbO$ = variation of $PbO$ portion in wt.%,
$\Delta SiO_2$ = variation of $SiO_2$ portion in wt.%,
$TiO_2$ = amount of $TiO_2$ added, in wt.%
$ZrO_2$ = amount of $ZrO_2$ added, in wt.%.

In addition to the above, the glasses may also contain the following further components (in wt.%); MO=alkaline earth metal oxides +ZnO:

| | | | |
|---|---|---|---|
| MO | 0.1-10, | preferably | 0.5-5 |
| $B_2O_3$ | 0.1-10, | preferably | 0.5-8 |
| $Al_2O_3$ | 0.1-6, | preferably | 1-3 |
| $GeO_2$ | 0.1-4, | preferably | 0.1-2 |
| $La_2O_3$ | 0.1-5, | preferably | 0.5-4 |
| $Bi_2O_3$ | 0.1-10, | preferably | 0.5-8 |
| $TeO_2$ | 0.1-5, | preferably | 0.1-2 |
| $CeO_2$ | 0.1-3, | preferably | 0.1-2 |
| $WO_3$ | 0.1-3, | preferably | 0.1-2 |
| $Y_2O_3$ | 0.1-10, | preferably | 0.5-5 |
| $Gd_2O_3$ | 0.1-15, | preferably | 0.5-10 |
| $Ta_2O_5$ | 0.1-3, | preferably | 0.2-2 |
| $Nb_2O_5$ | 0.1-5, | preferably | 0.5-3 | with the sum of these components not exceeding 20 wt.%, preferably not more than 15 wt.%.

Other than by varying the $PbO$ and $SiO_2$ contents, $TiO_2$ and $ZrO_2$ can also be introduced into known lead glass compositions, in an amount up to one third of the amount in which they were introduced according to Formula 1, by replacing other oxides contained in the glass in accordance with the following Formula 2:

$$TiO_2+ZrO_2 = x(|\Delta PbO| - |\Delta SiO_2|) - y(\Sigma|\Delta MvOw|), \quad (2)$$

with $x:y \geq 2$; wherein $\Delta MvOw$ = variation of an oxide MvOw in wt.%.

Figure 2:
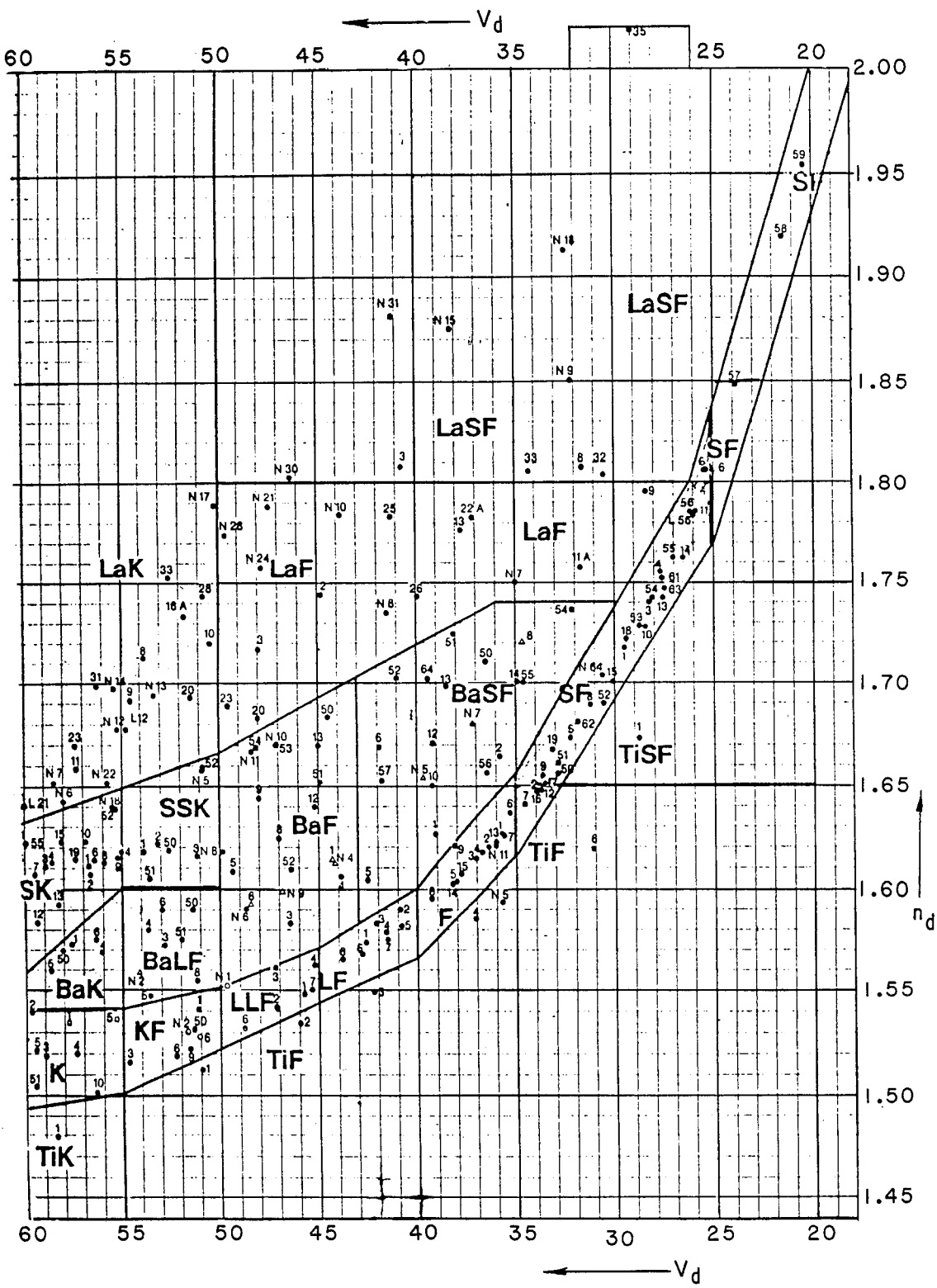
FIG. 2 shows optical properties of the Flint (F) and Heavy Flint (SF) region of the Abbe-diagram in Schott Catalog "Optical Glass" #3111.

Presently preferred glass compositions according to the present invention are those glasses with optical properties of the heavy flint (SF) region of the Abbe—diagram in Schott Catalog "Optical Glass", No. 3111 as seen in the shaded area of FIG. 2 which exhibit one or more of the following characteristic properties:

| | | | | | |
|---|---|---|---|---|---|
| $SiO_2$ | 15-60 | wt. %, preferably | 27-45 | wt. % | |
| $PbO$ | 30-80 | wt. %, preferably | 57-65 | wt. % | |
| $M_2O$ | 0.5-15 | wt. %, preferably | 0.8-10 | wt. % | ($M_2O$ = $Na_2O$, $K_2O$, $Cs_2O$) |
| $TiO_2$ | 0.6-2 | wt. %, preferably | 0.8-1.7 | wt. % | |
| $ZrO_2$ | 0.9-4 | wt. %, preferably | 1.2-3.8 | wt. % | |
| $As_2O_3$ | 0.1-0.5 | wt. %, preferably | 0.2-0.3 | wt. % | |
| $F^-$ | 0-0.5 | wt. %, preferably | 0-0.3 | wt. % | |
| $TiO_2:ZrO_2$ = | 0.3-2.0 | wt. %, preferably | 0.4-1.5. | | |

Acid Resistance Class SR 1 glasses require >100 hrs. to dissolve a standardized amount in standardized tests, while Class SR 2 requires 10-100 hours; Class SR 3 requires 1 10 hours while Classes 51-53 resist the acid for <0.1 hr.

Alkali Resistant Class AR 1 requires >100 min. to dissolve a standardized amount in standardized tests, while Class AR 2 requires 30-120 min. and Class AR 3 only 7.5-3.5 min. The following key is used to characterize visible surface changes:

0.0 no change
0.1 scarred surface but no visible color charge
0.2 interference colors
0.3 whitish staining
0.4 thick white coating The glasses according to this invention can be applied in any application range normally envisaged for conventional lead glasses, e.g. they can be used as optical glass, ophthalmic glass, radiation-protection glass, videoscreen glass, electrode glass, sounding glass, technical glass, optical and technical glass fibers, or as lead crystal glass.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

EXAMPLE 1

The glasses according to the invention are produced as follows: The raw materials (oxides, carbonates, potentially used complex compounds and fluorides) are weighed; a refining agent such as $As_2O_3$ in combination with a fluoride in percentages of 0.1-1 wt.% is added and the whole batch well mixed. The batch is melted down at about 950°-1300° C. in a platinum crucible or in a ceramic melting tank, then refined and well homogenized by means of stirring equipment. At a casting temperature of approximately 750°-1000° C. the glass is then processed to the desired dimensions.

Sample melt for 100 kg calculated glass (Example 4, Table 2):

| Oxide | Wt. % | Raw Material | Weighed Portion (kg) |
|---|---|---|---|
| $SiO_2$ | 27.70 | quartz powder | 27.70 |
| PbO | 67.30 | $Pb_3O_4$ | 68.90 |
| $Na_2O$ | 0.50 | $Na_2CO_3$ | 0.90 |
| $K_2O$ | 1.00 | $K_2CO_3$ | 1.50 |
| $TiO_2$ | 1.30 | $TiO_2$ | 1.30 |
| $ZrO_2$ | 2.00 | $ZrO_2$ | 2.00 |
| $As_2O_3$ | 0.20 | $As_2O_3$ | 0.20 |

Table 2 shows some illustrative examples of embodiments of glasses according to the invention in comparison with conventional lead glasses.

TABLE 2

|  | TYPE SF 1 | | TYPE SF 3 | | TYPE SF 4 | | TYPE SF 6 | |
|---|---|---|---|---|---|---|---|---|
|  | Ex. 1 | Schott catalog | Ex. 2 | Schott catalog | Ex. 3 | Schott catalog | Ex. 4 | Schott catalog |
| $SiO_2$ | 34.50 | 34.00 | 32.50 | 31.80 | 31.40 | 31.00 | 27.70 | 27.30 |
| PbO | 57.30 | 61.60 | 59.40 | 64.00 | 61.50 | 66.00 | 67.30 | 71.00 |
| $Na_2O$ | 1.50 | 1.50 | 1.60 | 1.50 | 0.80 | 0.80 | 0.50 | 0.50 |
| $K_2O$ | 2.60 | 2.60 | 2.60 | 2.50 | 1.90 | 2.00 | 1.00 | 1.00 |
| $TiO_2$ | 1.10 | — | 1.10 | — | 1.50 | — | 1.30 | — |
| $ZrO_2$ | 2.70 | — | 2.60 | — | 2.70 | — | 2.00 | — |
| $As_2O_3$ | 0.30 | 0.30 | 0.20 | 0.20 | 0.20 | 0.20 | 0.20 | 0.20 |
| $F^-$ | — | — | — | — | 0.30 | — | — | — |
| $n_d$ | 1.719 | 1.717 | 1.742 | 1.740 | 1.754 | 1.755 | 1.809 | 1.805 |
| $v_d$ | 29.5 | 29.5 | 28.4 | 28.2 | 27.6 | 27.6 | 25.3 | 25.4 |
| $\tau_{25mm}^{400 nm}$ | 0.90 | 0.89 | 0.75 | 0.86 | 0.81 | 0.84 | 0.73 | 0.73 |
| SR Class* | 1 | 3 | 1-2 | 51 | 1 | 51 | 2 | 52 |
| AR Class* | 1.2 | 2.3 | 1.2 | 2.3 | 1.3 | 2.3 | 1.2 | 2.3 |
| OEG** °C. | — | — | — | — | — | — | — | — |
| HK | 390 | 340 | 360 | 330 | 370 | 330 | 360 | 310 |
| $\alpha$ ($10^{-7}$/K) | 79 | 81 | 82 | 84 | 79 | 80 | 80 | 81 |
| $\rho$ (g/cm$^3$) | 4.37 | 4.46 | 4.54 | 4.64 | 4.66 | 4.79 | 5.06 | 5.18 |
| Tg (°C.) | 428 | 417 | 429 | 415 | 435 | 420 | 434 | 423 |

*SR, AR = Acid resistance and alkali resistance classes (see Schott catalog "Optical Glass", No. 3111, 1980 edition). Acid resistance (SR) is classified on the basis of the time required to dissolve a 0.1 μm layer with a solution of 0.5 N $HNO_3$, pH 0.3 at 25° C.; alkali resistance (AR) is similarly classified using NaOH, pH 10 at 90° C.

**OEG = upper devitrification temperature at rising temperature in gradient furnace and 5' tempering.

The preceding examples can be repeated with similar success by substituting the generically or specifically described reactants and/or operating conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

Industrial Applicability

As can be seen from the present specification and examples, the present invention is industrially useful in providing new and improved glass compositions for use as as optical glass, ophthalmic glass, radiation-protection glass, videoscreen glass, electrode glass, sounding glass, technical glass, optical and technical glass fibers, or as lead crystal glass.

What is claimed is:

1. A high PbO-content optical glass with optical properties of the heavy flint (SF) region of the Abbe—diagram of FIG. 2 wherein the glass has a refractive index $n_d$ of 1.65-1.85, an Abbe number $v_d$ of 35-25, an acid resistance of SR class 1-2 and consists essentially of the following composition, in weight%:

$SiO_2$ 15-60
PbO 30-80
$M_2O$ 0.5-15 ($M_2O = Na_2O$, $K_2O$, $Cs_2O$)
$ZrO_2$ 0.9-4
$TiO_2$ 0.6-2 wherein $ZrO_2 + TiO_2 = 1.5$-6 and $TiO_2$:$ZrO_2 = 0.3$-2.0,
$As_2O_3$ 0.1-0.5
$F^-$ 0-0.5 and up to 20 wt.% of the following further components:

| alkaline earth metal oxides + ZnO | 0.5-5 |
|---|---|
| $B_2O_3$ | 0.5-8 |
| $Al_2O_3$ | 1-3 |
| $GeO_2$ | 0.1-2 |
| $La_2O_3$ | 0.5-4 |
| $Bi_2O_3$ | 0.5-8 |
| $TeO_2$ | 0.1-2 |
| $CeO_2$ | 0.1-2 |
| $WO_3$ | 0.1-2 |
| $Y_2O_3$ | 0.5-5 |
| $Gd_2O_3$ | 0.5-10 |
| $Ta_2O_5$ | 0.2-2 |
| $Nb_2O_5$ | 0.5-3. |

2. Glass according to claim 1 containing at least 45% PbO.

3. Glass according to claim 1 containing 50-80% PbO.

4. Glass according to claim 1 containing 25-60% $SiO_2$.

5. Glass according to claim 1 further characterized by containing ($TiO_2 + ZrO_2$) in an amount of 2.0-5.5 wt.% at a $TiO_2$:$ZrO_2$ ratio of 0.4-1.5.

6. Glass according to claim 1 consisting essentially of the following composition, in wt.%:

| $SiO_2$ | 27-45 | |
| PbO | 57-65 | |
| $M_2O$ | 0.8-10 | ($M_2O = Na_2O$, $K_2O$, $Cs_2O$) |
| $ZrO_2$ | 1.2-3.8 | |
| $TiO_2$ | 0.8-1.7 | |
| $As_2O_3$ | 0.2-0.3 | |
| $F^-$ | 0-0.3 | and wherein |
| $TiO_2$:$ZrO_2$ | = 0.4-1.5. | |

7. In an article of manufacture comprising optical glass, ophthalmic glass, radiation-protection glass, videoscreen glass, electrode glass, sounding glass, technical glass, optical or technical glass fibers, or lead crystal glass, the improvement wherein the glass component is a composition according to claim 1.

* * * * *